United States Patent [19]

Fisher

[11] Patent Number: 5,355,921

[45] Date of Patent: Oct. 18, 1994

[54] PROCESS AND APPARATUS FOR SELF SHARPENING A PELLET LATHE KNIFE

[76] Inventor: Gerald M. Fisher, 1491 Greenwood Ave., Palo Alto, Calif. 94301

[21] Appl. No.: 65,931

[22] Filed: May 21, 1993

Related U.S. Application Data

[63] Continuation-in-part of Ser. No. 895,605, Jun. 8, 1992, Pat. No. 5,215,135.

[51] Int. Cl.$^5$ .......................... B27M 1/00; B27C 1/00
[52] U.S. Cl. ........................................ 144/364; 451/449; 451/45; 83/171; 144/209 R; 144/211; 144/213; 144/361; 144/365
[58] Field of Search ..................... 83/169, 171; 51/285, 51/266, 241.8, 246; 144/209 R, 212, 215, 365, 361, 364

[56] References Cited

U.S. PATENT DOCUMENTS

| | | | |
|---|---|---|---|
| 2,851,764 | 9/1958 | White | 51/266 |
| 3,265,103 | 8/1966 | Hervey | 144/212 |
| 3,777,794 | 12/1973 | McDonald | 144/364 |
| 3,866,642 | 2/1975 | Walser | 144/212 |
| 4,621,669 | 11/1986 | Kivimaa | 144/209 R |
| 5,129,190 | 7/1992 | Kovach et al. | 51/266 |

*Primary Examiner*—W. Donald Bray

[57] ABSTRACT

A process for selectively abrading one surface of a veneer knife at a higher rate that the other face and includes a novel way of providing lubricating and cooling fluid to the faces of the knife wherein the majority of the lubricant is provided to the face which abrades slower to further enhance the self sharpening of the knife.

14 Claims, 3 Drawing Sheets

PROCESS AND APPARATUS FOR SELF SHARPENING A PELLET LATHE KNIFE

RELATED INVENTION

This invention is a continuation-in-part of application Ser. No. 895,605, filed Jun. 8, 1992, now U.S. Pat. No. 5,215,135 issued Jun. 1, 1993, entitled "Pellitizer Methods and Apparatus" inventors Robert D. Coakley and Gerald M. Fisher.

FIELD OF THE INVENTION

This invention relates to equipment and methods for making pellets of wood directly from a log portion with a veneer type lathe device.

BACKGROUND OF THE INVENTION

The related above cited invention is a method and apparatus for making fuel pellets directly from a log. The prior pellet manufacturing equipment for making pellets involved grinding sawmill residues and chips and compressing the ground materials at high pressures through extrusion dies. These extrusion mills are very expensive to operate and to build.

There is a need for a machine to convert logs, especially certain types of non-commercial hardwood directly into fuel pellets. The cost of construction and operation of such machines must be low compared to the extrusion mills. The veneer lathe type of machine in the parent related invention employs a peripheral log drive with at least three rolls which compress the log therebetween. The rolls have cutting surfaces to incise a shape into the surface of the log. The log is peeled with a veneer knife which cuts to a depth less than the incised depth. The veneer knife must be maintained in sharp condition in order to cleanly peel the log along the grain. If the knife loses its edge the power required to drive the log increases rapidly and the smoothness of the finished product diminishes.

It has been customary to immerse the logs to be peeled for the plywood in water for up to one month and to steam heat the log and its absorbed water immediately prior to peeling. It is believed that the absorbed water extends the life of the knife and serves as a lubricant as well as a coolant for the veneer knife. However, since product throughput i.e. production rate, is a most important factor, longer life knife edges are constantly being sought.

One of the major benefits of the peeling lathes are their ability to operate at high speeds. To sustain the highest speeds, it has been customary to use the highest grade tool steel for the veneer knives and to change out and sharpen the knives frequently as necessary. Most plywood facilities replace and refinish the veneer knives after four hours of use.

It is an object of this invention to reduce the downtime and cost of frequent veneer knife replacement and refinishing.

It is a further object of this invention to render the veneer knife self sharpening.

It is a still further object to provide an extremely long life veneer knife for pellet lathe devices.

DETAILED DESCRIPTION OF THE INVENTION

Figure 1:
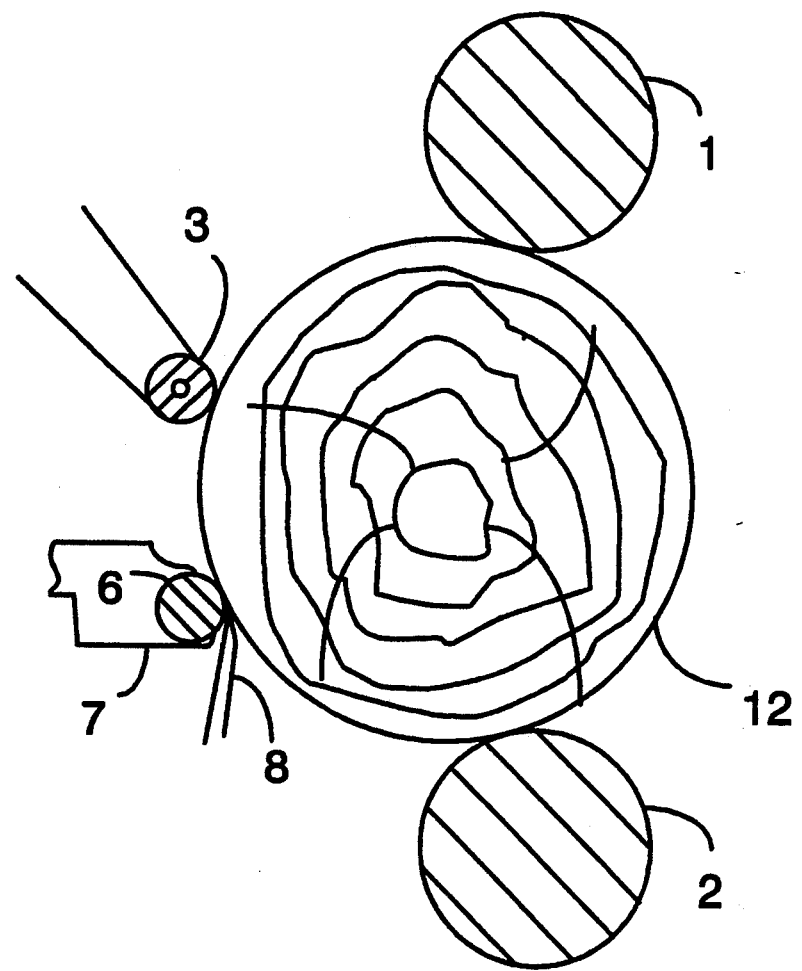
FIG. 1 is a functional diagram of a peripheral drive and veneer knife arrangement of this invention.

With reference to FIG. 1, the log 12 to be pellitized is grasped and compressed between the three rolls 1,2,3. Roll 6 is a nose bar which is very closed placed as a backup anvil to the knife 8. One or two of the rolls 1,2 and 3 can be idler rolls. The rolls are grooved, as depicted in the parent invention for incising the periphery of the log.

Figure 2:
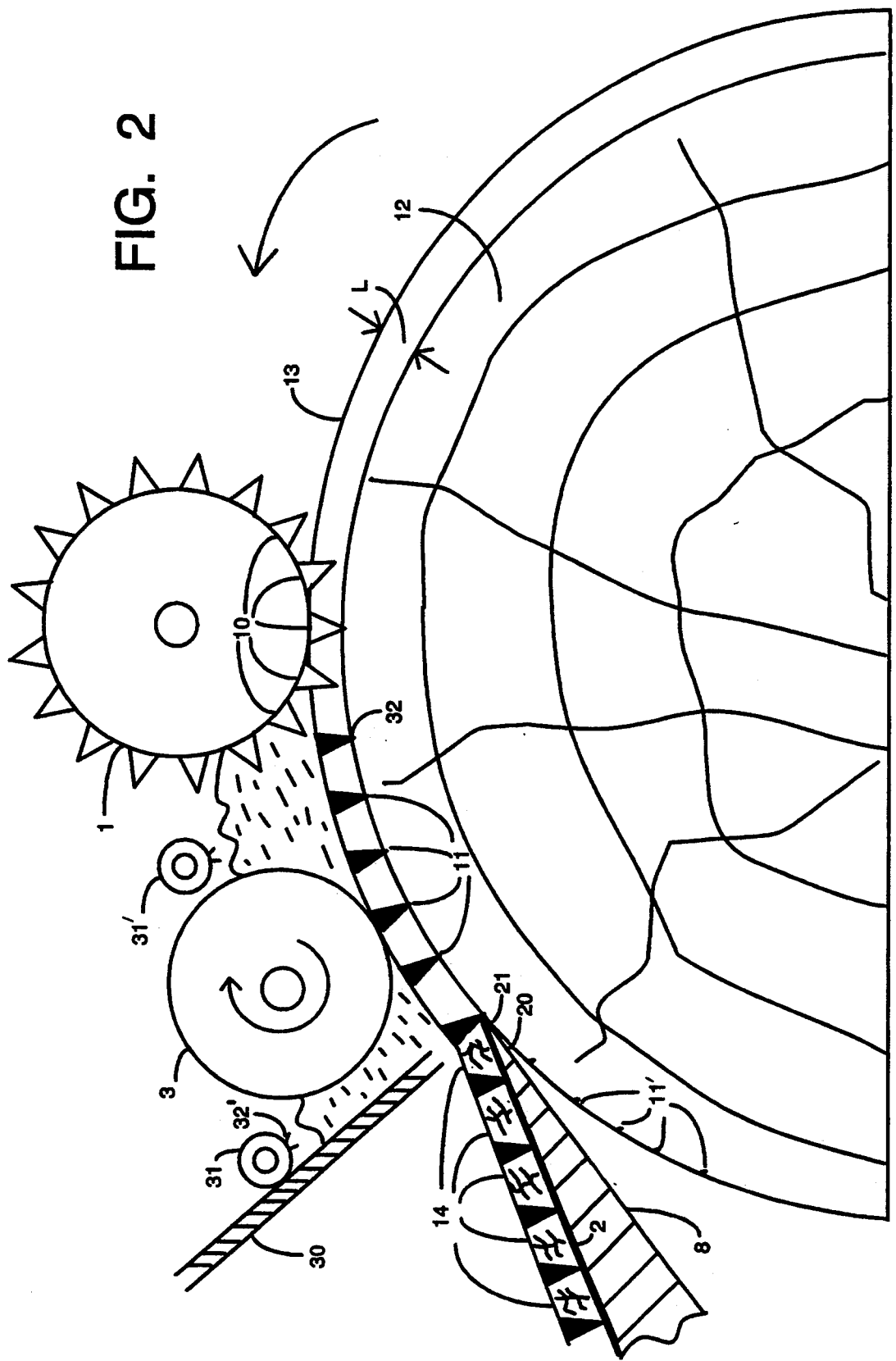
FIG. 2 is a functional schematic of a drive roll, a knife and lubrication injector of this invention.

With reference, to FIG. 2, for example, roll 1 is the sole drive roll having axially aligned incising edges 10 creating incisions 11 into the surface 13 of the log. The incisions 11 are on the order of 5/16 inches in depth. The knife 8 is arranged to peel a ½ inch veneer which separates the incised pellets 14.

In opposition to the prior art uses of the veneer knife, the product in a pellet lathe, i.e. the pellets in the upper face region 22 of knife are cut into separate parts and can tumble whereas the log in the lower face region 20, especially near the knife tip 21 is in constant abrasive contact with the knife. When the diameter of the log 12 is large, the log stays in contact with the knife along a longer front as shown by line 24 in FIG. 3. When the log diameter becomes small, the contact region on the lower knife face is reduced to the area designated by line 26. Since, the pellets are loose and tumbling over the surface 22 as opposed to the constant abrasion on surface 20, the lower face of the knife will be worn away considerably faster than the upper face. The wear line will follow the line 26. As can be seen on FIG. 3, the veneer knife in the pellet process is inherently self sharpening by the distinction between the frictional processes involved on the two surfaces.

Figure 3:
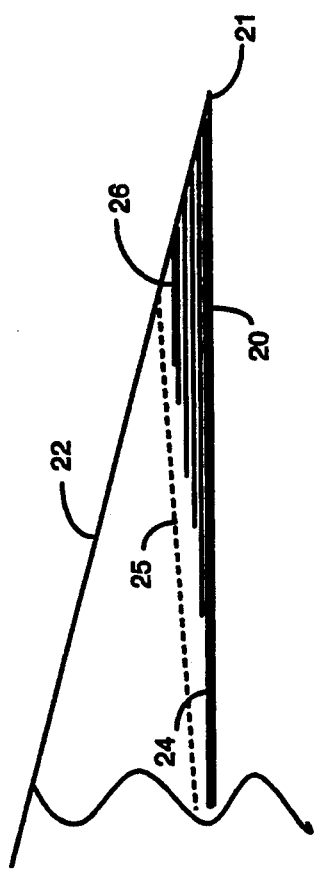
FIG. 3 is a veneer knife cross section with a showing of the regions of maximum wear and self sharpening effects.

It can be seen on FIG. 3, line 25, that although the knife faces are differentially abraded, the sharpness of the tip will still slowly decrease and the angle between face 22 and 20 will increase. This effect will slowly cause the thickness of the veneer to decrease unless knife adjustments are made. By periodically flipping the knife blade to reverse the face positions, top to bottom, the thickness of the veneer can be retained and the knife life can be improved.

The self sharpening of the knife can be considerably enhanced by enhancing the differential friction on the knife faces so that one face is harder than the other or by reducing the frictional forces on one face more than on the other.

In order to further increase the life of the veneer knife, a lubricant can be added to the region near the knife edge. With respect to FIG. 2, the lubricant, preferably is injected in the region of the log before the veneer knife with a containment baffle 30 through a plenum pipe 31 and 31'. If gravity doesn't assist, then nozzles 32' are needed. As shown, the preferred configuration introduces the lubricant adjacent to the nose bar roll 3 which carries it under the nosebar and into contact with the log periphery. Note that the log surface has been previously incised which incisions 11 then fill with lubricant, especially in the region 32 where the incisors 10 are rapidly withdrawn from the log surface creating a vacuum which sucks the lubricant fluid into the incisions 11.

Since incision 11 is deeper than the knife depth L, there is also lubricant which is carried beneath the knife face in the region 20 contacted by the bottom of the incisions 11' between the log and the knife. However, the majority of the lubricant is moved onto and released on the upper surface of the knife along with the pellets. Since much greater lubricant volume is released on the upper surface, the self sharpening process described above is further enhanced. In other words, the lubricant decreases the coefficient of friction on all faces of the knife and will increase the knife life by significant percentages, but most importantly, the self sharpening effect will be enhanced because the friction on the upper surface will be reduced to a significantly greater extent. Obviously, the introduction of lubricant provides the added advantage of carrying heat from the knife and cooling the knife, thereby enabling still higher speed operation.

Injection of the lubricant is not necessary if the knife and log are arranged so that gravity will retain the lubricant in contact with the incisions in the periphery of the log long enough to fill them and so that the lubricant does not run out of the incisions before peeling takes place. This implies that the best veneer knife location be at/near the upper tangent to the log periphery. If the knife is located elsewhere around the log periphery, it may become expensive and complicated to contain the lubricant in contact with and retained by the incisions.

Figure 4:
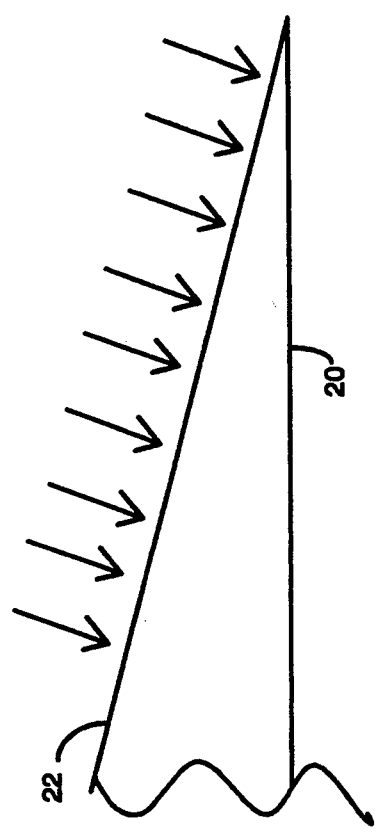
FIG. 4 is a schematic of a nitriding ion implantation process.

Another technique to improve the knife wear is schematically illustrated in FIG. 4. It is known to employ nitridation by plasma implantation to harden cutting tools. It is also known that the hardening by nitridation is only a surface treatment to a depth less than 1000 Angstroms. Accordingly, to further improve the self sharpening, the knife edge should be selectively hardened on the upper surface 22 as compared to lower surface 20. This can be carried out by diffusion nitriding the entire knife in a chamber then removing the nitridation on the lower surface 20 or by selective hardening of the upper surface only. The nitriding ion implantation processes for hardening is disclosed in the papers of J. R. Conrad's group such as "Nitrogen Plasma Source Ion Implantation of A1SI S1 Tool Steel" Jrl. of Mat. Processing Tech., 30 (1992), p 253-261.

The lubrication material most convenient to use is water. Although water introduces corrosion problems since it acts as an oxygen containing electrolyte, because of the constant abrasion on the knife any oxide protective films are already being removed continuously. However, the water can increase corrosion on the other parts of the machine in which it comes into contact. Essentially any fluid or even soft fine powders will serve as the friction reducing lubrication to accomplish the objectives of this invention. Grain alcohol is a generally inexpensive lubricant which will have the added benefit of leaving a residue on the pellet which will make them a little more combustible without increasing air pollution or introducing an offensive smell to the pellets.

It is understood that these embodiments are merely examples and that the scope of the invention is to be determined by claims. With this in view,

What is claimed is:

1. A method for self sharpening a pellet lathe veneer knife having a first and second face comprising, peeling a previously incised log with a veneer knife to create separated loose pellets and a peeled surface;

passing said separated pellets over and in contact with said first face of the said veneer knife;

passing said peeled surface of said log in contact with said second face of the said veneer knife; and selectively abrading, during operating, said second face of said veneer knife more rapidly than said first face of said veneer knife.

2. The method of claim 1, wherein said step of selectively abrading comprising lubricating said first face of said veneer knife to provide a lower coefficient of friction with said separated pellets than the coefficient of said second face of said veneer knife and said peeled surface.

3. The method of claim 2 wherein said step of lubricating comprises introducing lubricant into said incised portions of said log and wherein the step of peeling a previously incised log releases lubricant trapped in said incised portions.

4. The method of claim 3 wherein the majority of said released lubricant is carried with said pellets to the contact with said first face to provide lower friction at said first face than said second face.

5. The method of claim 1 wherein said step of selectively abrading comprises moving said separated loose pellets over said first face wherein said separated loose pellets have a lower coefficient of friction with said first face than the coefficient of friction between said log and said second face.

6. The method of claim 5 wherein said step of selectively abrading comprised using a knife in which said first face is harder than said second face.

7. The method of claim 6 wherein said step of selectively abrading comprises nitriding both said first and said second face and selectively removing the nitridation from said second surface.

8. A pellet peeler lathe for making pellets directly from a cylindrical member comprising, at least three rolls for compressing said cylindrical member and for incising pellet cross section into the periphery of said cylindrical knife member;

a veneer knife, said veneer knife having a first and second intersecting face, said veneer knife being mounted for peeling a thickness from said cylindrical member which is less than the depth of said incising; and means for self sharpening said veneer knife while pelletizing said cylindrical member.

9. The apparatus of claim 8 wherein said means for self sharpening said veneer knife while pelletizing said cylindrical member comprises means for passing the separated pellets across said first face, and means for passing the periphery of said log across said second face.

10. The apparatus of claim 9 wherein said means for passing the separated pellets across said first face includes means for providing lubricant into said incisions prior to cut-off wherein said lubricant is released at cut-off and the majority of which lubricant passes in contact with said first face.

11. The apparatus of claim 9 wherein said means for passing the periphery of said log across said second face includes means for injecting lubricant into said incisions prior to cut-off and wherein some of said released lubricant passes in contact with said second surface.

12. The method of claim 3 wherein said lubricant is water.

13. The apparatus of claim 10 wherein said lubricant is water.

14. The apparatus of claim 11 wherein said lubricant is water.

* * * * *